April 22, 1958     E. A. MEYER ET AL     2,831,648

CONTROLLING DEVICE FOR VALVE

Filed April 27, 1955

INVENTORS
EARL A. MEYER
MELVIN J. BINA

BY *John L. Diehl*
Attorney

United States Patent Office 2,831,648
Patented Apr. 22, 1958

2,831,648

CONTROLLING DEVICE FOR VALVE

Earl A. Meyer, Madison, Wis., and Melvin J. Bina, Albuquerque, N. Mex., assignors to Bjorksten Research Laboratories, Inc., Madison, Wis., a corporation of Illinois Application April 27, 1955, Serial No. 504,194

1 Claim. (Cl. 251—81)

This invention relates to a device utilized in controlling valves, and more particularly to a combination valve and ratchet which regulates the flow of minute amounts of fluid into a vacuum system.

Heretofore, much difficulty has been encountered in regulating the flow of fluids into a vacuum system. One of the main difficulties is that the liquid enters at a high rate of speed, thereby making it necessary to close the valve with celerity. With such a celerous movement the valve is screwed down so tightly that it may stick and cause the operator to miscalculate the amount of pressure needed to reopen the valve; the direct result is that excessive fluid is allowed to enter the vacuum system. Although a lubricant may be used to ease the turning and reduce the jamming of a valve, such lubricant may cause stopcocks to slip especially in the presence of a relatively high temperature. It is believed that a competent device for solving these problems is met in this invention.

An object of this invention is to provide a device which adjusts the amount of pressure needed to close a valve used for vacuum systems.

Another object is to provide a device which will prevent the jamming of valves for high vacuum systems and the like.

Another object is to provide a device which will prevent the slipping of stopcocks operating in an environment of high temperature.

Another object is a device for allowing positive control of the valve while it is opened.

Other objects of our invention will become apparent in the following description.

Figure 1:
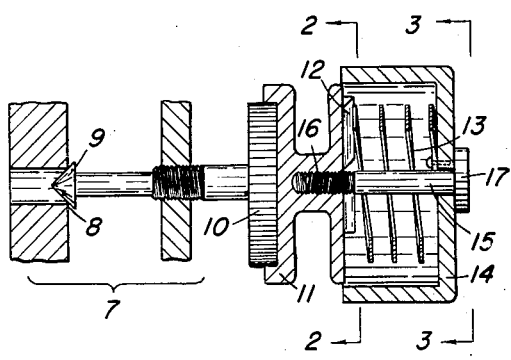
Figure 1 is a cross-sectional view of the controlling device attached to a valve knob.
Figure 2:
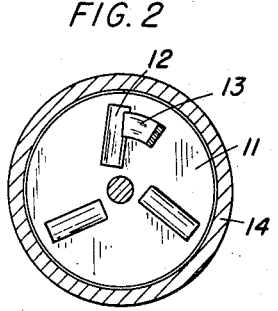
Figure 2 is a cross-sectional view taken at line 2—2 in Figure 1.
Figure 3:
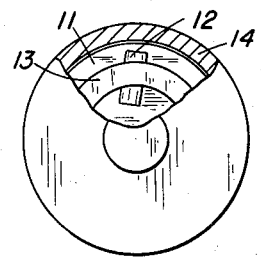
Figure 3 is a view taken at line 3—3, partially cut away.

Referring now to Figures 1 to 3, there is shown a valve 7 comprising a seat 8, a plunger or closing member 9 and an operating knob 10. Attached to the outer end of knob 10 is the inner or first knob 11 of the controlling device. The inner knob may be attached to the valve stem by an interference fit as shown or by any other suitable means. It can be welded, bolted or the two parts may be made in one piece. Three ratchet lugs 12 may be equally spaced on the outer face of the inner knob. A greater or lesser number can be used. A spring 13 is compressed between the inner knob and an outer or second knob 14. The tension on the spring is controlled by knob-retaining-bolt 15 which at the innermost end may be securely attached to inner knob 11, for example by a threaded connection as at 16, and which at the outermost end is provided with a head 17 adapted to retain knob 14 rotatably on member 15. The tension of spring 13 may be adjusted by adjusting the extent to which bolt 15 is screwed into knob 11. One end of the spring is securely attached to the outer knob 14.

To close the valve, the outer knob 14 is turned counter to the direction of rotation of the spring. As the knob 14 and spring 13 rotate, the friction between spring 13 and inner knob 11 causes the inner knob and the valve to rotate until the valve plunger 9 seats on seat 8. When valve plunger 9 has seated, spring 13 will slip over the lugs 12 if outer knob 14 continues to be turned. No matter how much force is exerted on outer knob 14, no torque greater than that produced by sliding friction of spring 13 with lugs 12 will be transmitted to the valve 10.

To open the valve, the outer knob is turned in the direction of rotation of the spring. Then, the end of spring 13 engages one of the lugs 12 and thereby causes the inner knob to rotate as the outer knob is turned. The rotation of knob 11 withdraws the valve from its seat.

Figure 4:
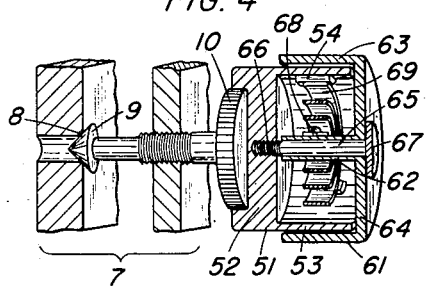
Figure 4 is a cross-sectional, perspective view of another embodiment of this invention in which a circular spring is used and in which the lugs are located on the circumferential wall.

Figure 4 shows another embodiment of this device in which there is attached to knob 10 an inner knob 51, consisting of a web 52 and a circumferential flange 53. Three ratchet lugs 54 are equally spaced in the internal face of flange 53; a greater or lesser number may be used. An outer knob 61 consisting of a hollow core 62, a circumferential flange 63, and a connecting web 64, is connected to the inner knob 51 by a connecting bolt 65 which is attached, for example by a threaded connection, to inner knob 51, as at 66, and which is provided a head 67 adapted to retain knob 61 rotatably on bolt 65.

Spiral spring 69 is provided in the space enclosed by flange 53, web 52 and web 64; its innermost end may be securely attached to core 62 as at 68 and its outermost end may contact the inner face of flange 53 with sufficient force, due to the compression of the spring, to insure that it will engage one of lugs 54 if knob 61 is rotated in a suitable direction. Substantially, operation of this embodiment is identical to that of the embodiment previously described.

Other embodiments can be made without the lugs previously described; the inner knob may rotate when the outer knob is turned in the proper direction by the frictional engagement of spring 13 or 67 with the inner knob.

Having thus disclosed our invention, we claim:

In a valve comprising a body, a seat and a closing member, means attached to said closing member to prevent the use of excessive closing force thereon, said means comprising a first knob securely attached to said closing member and adapted to rotate therewith, a member projecting axially from said knob and provided at its outer end with means adapted to rotatably retain a second knob thereon, a second knob rotatably retained thereon, and a spring interposed between said first knob and said second knob said spring being a helical spring and being firmly attached at one end to said outer knob, said inner knob provided with projections extending upwardly therefrom, said spring frictionally engaging said projections.

References Cited in the file of this patent

UNITED STATES PATENTS

| | | |
|---|---|---|
| 1,167,285 | Flogland | Jan. 4, 1916 |
| 1,468,322 | Odom | Sept. 18, 1923 |

FOREIGN PATENTS

| | | |
|---|---|---|
| 54,408 | Austria | 1912 |